H. H. PEMBER.
Boiling Kettle.
No. 78,823.
Patented June 9, 1868.
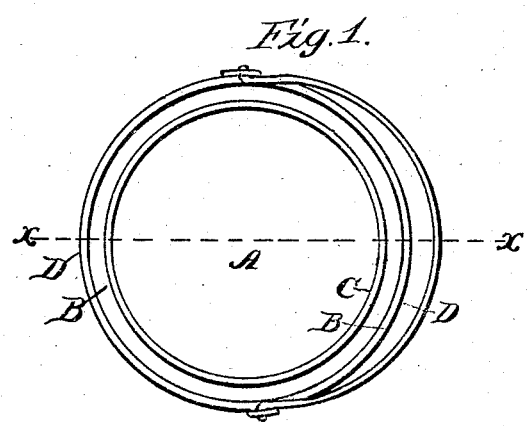
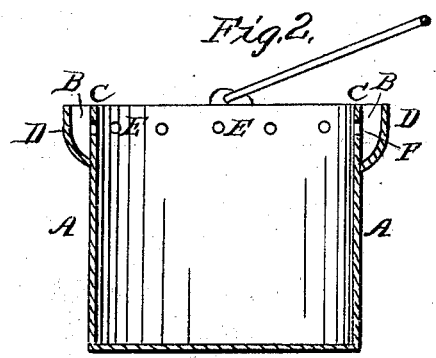
Witnesses,
Theo. Tusche
J. A. Service
Inventor:
H. H. Pember
Per Munn & Co
Attorneys

United States Patent Office.

H. H. PEMBER, OF NEW YORK, N. Y.

Letters Patent No. 78,823, dated June 9, 1868.

---

IMPROVEMENT IN BOILING-KETTLES.

---

The Schedule referred to in these Letters Patent and making part of the same.

---

TO ALL WHOM IT MAY CONCERN:

Be it known that I, H. H. PEMBER, of the city, county, and State of New York, have invented a new and improved Vessel; and I do hereby declare that the following is a full, clear, and exact description thereof, which will enable others skilled in the art to make and use the same, reference being had to the accompanying drawings, forming part of this specification.

The present invention relates more particularly to that class of vessels commonly known as and called "kettles," and used for the boiling of water upon cooking and other stoves and ranges, although the principle of construction involved can be applied to other forms and kinds of vessels employed for many other purposes.

The invention consists in providing the vessel, around its top or upper edge, and outside of the main body of the vessel, with a gutter or channel, that, as the water in the vessel boils or foams over, will catch the same, and return it back again into the vessel or kettle, through suitable communicating-apertures around the said channel therefor, the object being to prevent all possibility of the water boiling over and being thrown out upon the stove, &c.

In the accompanying plate of drawings, my improvement in vessels is illustrated—

Figure 1 being a plan or top view, and

Figure 2 a central vertical section taken in the plane of the line $x$ $x$, fig. 1.

Similar letters of reference indicate like parts.

A, in the drawings, represents the body of the vessel, which, in the present instance, is made in the form of a kettle, for boiling water for cooking purposes.

B, a channel or groove around the upper or top edge, C, to the body A, which channel is on the outside, and is formed by means of a projecting or raised lip, D.

E, a series of apertures in body A of kettle, forming a communication between it and its surrounding channel or groove B.

By means of the channel or groove, the boiling over of the kettle upon the stove is entirely prevented, as the water thrown out falls into the said groove, and from that, through its aperture E, is conducted back into the kettle.

A cover of the common form can be easily fitted over the outer edge of the gutter or channel B, if desired.

Having thus described my invention, I claim as new, and desire to secure by Letters Patent—

A vessel, provided with a channel, B, around its upper edge, which communicates with the interior of the vessel by means of apertures E, as described, and for the purpose specified.

The above specification of my invention signed by me, this 6th day of May, 1867

H. H. PEMBER.

Witnesses:
    ALEX. F. ROBERTS,
    J. M. COVINGTON.